United States Patent [19]
Johnson

[11] Patent Number: 6,082,123
[45] Date of Patent: *Jul. 4, 2000

[54] FROZEN BEVERAGE DISPENSER

[76] Inventor: Greg A. Johnson, 16002 Garden Hill, Houston, Tex. 77095

[ * ] Notice: This patent is subject to a terminal disclaimer.

[21] Appl. No.: 08/948,556

[22] Filed: Oct. 10, 1997

Related U.S. Application Data

[63] Continuation of application No. 08/450,889, May 26, 1995, Pat. No. 5,709,095.

[51] Int. Cl.⁷ ..................................................... A23G 9/16
[52] U.S. Cl. ................................ 62/136; 62/342; 366/311
[58] Field of Search ............................. 62/136, 264, 342, 62/343; 222/146.6; 366/311, 331

[56] References Cited

U.S. PATENT DOCUMENTS

| | | | |
|---|---|---|---|
| 2,559,032 | 7/1951 | Tacchella | 62/136 |
| 3,108,449 | 10/1963 | Lents | 62/136 |
| 3,188,826 | 6/1965 | Carpigiani | 62/136 |
| 3,626,709 | 12/1971 | Yuza | 62/136 |
| 3,698,203 | 10/1972 | Stoelting | 62/136 |
| 3,823,571 | 7/1974 | Shith et al. | 62/136 |
| 4,736,593 | 4/1988 | Williams | 62/136 |
| 5,709,095 | 1/1998 | Johnson | 62/136 |

Primary Examiner—William E. Tapolcai
Attorney, Agent, or Firm—Nick A. Nichols, Jr.

[57] ABSTRACT

The present invention provides an improved frozen beverage dispenser overcoming the disadvantages of the prior art noted above. Not only is the beverage dispenser relatively simple to construct and maintain, but it also provides an exceptionally fast freeze down time and accurate monitoring and control of the thickness of the slush dispensed from the beverage dispenser of the invention. The components of the beverage dispenser of the invention are housed within a compact housing incorporating solid state design with few mechanical moving parts. The closed loop system includes an evaporator, heat exchanger, condenser, compressor, and a filter/dryer. A tank feed system directs the beverage mix to a cylindrical mixing chamber having a rotatable beater bar located therein. The beater bar is coupled to a direct drive control system which monitors and controls the thickness of the slush formed in the mixing cylinder. The mixing cylinder is provided with a rear seal mount assembly which permits quick connect and disconnect of the beater bar from the mixing cylinder.

2 Claims, 5 Drawing Sheets

FROZEN BEVERAGE DISPENSER

This is a continuation application of U.S. patent application Ser. No. 08/450,889 filed May 26, 1995, now U.S. Pat. No. 5,709,095.

BACKGROUND OF THE DISCLOSURE

The present invention is directed to a beverage dispenser, particularly, a frozen beverage dispenser utilizing a direct drive control system for accurately monitoring and controlling the thickness of the frozen beverage dispensed from the beverage dispenser of the invention.

Equipment for dispensing frozen or semi-frozen products such as margaritas, daiquiris, frozen lemonade, and frozen natural fruit juices are well known in the prior art. Such devices vary from a simple hand crank unit used to make homemade ice cream to high capacity, high output cocktail freezers used by commercial establishments. Two features of great importance for beverage dispensing equipment is freeze down time and consistency of delivered product. Both of these features are particularly important to commercial establishments where high output yields high profits.

Prior art designs of frozen beverage dispensers are typically large and unattractive or alternatively, compact and low production units. Prior art dispensers typically include large belt driven units requiring large flywheels to gain the torque required to drive the beater and mechanical controls which monitor and control the temperature or thickness of the slush in the freezing cylinder. These belt driving units were typically noisy and prone to freeze ups and mechanical failure. As the belts age or incorrect beverages are placed in the dispenser, the formation of ice blocks in the freezing cylinder commonly occurs causing belt slippage and other mechanical breakdowns. Prior art dispenser units commonly employ a continuous copper coil evaporator operating at a relatively low temperature differential resulting in an inefficient cooling unit. Another disadvantage associated with prior art dispenser units is high maintenance requiring daily disassembly and lubrication of the mixing cylinder assembly and well trained personnel to operate and maintain the dispenser unit. These and other disadvantages are overcome by the compact and relatively maintenance free design of the beverage dispenser of the present invention.

It is therefore an object of the present invention to provide a frozen beverage dispenser which consistently and accurately maintains a set product slush thickness regardless of the beverage ingredients mixed to form the frozen beverage. This is accomplished by a directed drive control system which monitors and controls the thickness of frozen slush in the dispenser by periodically turning on and off the flow of refrigerant to the freezing chamber containing the selected beverage mix.

It is another object of the present invention to provide a frozen beverage dispenser which utilizes an improved rear seal mount assembly in the mixing cylinder which provides a fluid seal about the rotary shaft of the beater bar, yet provides a quick connect/disconnect coupling for removal of the beater bar from the mixing cylinder.

SUMMARY OF THE INVENTION

The present invention provides an improved frozen beverage dispenser overcoming the disadvantages of the prior art noted above. Not only is the beverage dispenser relatively simple to construct and maintain, but it also provides an exceptionally fast freeze down time and accurate monitoring and control of the thickness of the slush dispensed from the beverage dispenser of the invention. The components of the beverage dispenser of the invention are housed within a compact housing incorporating solid state design with few mechanical moving parts. The closed loop refrigeration system includes an evaporator, heat exchanger, condenser, compressor, and a filter/dryer. A tank feed system directs the beverage mix to a cylindrical mixing chamber having a rotatable beater bar mounted therein. The beater bar is coupled to a direct drive control system which monitors and controls the thickness of the slush formed in the mixing cylinder. The mixing cylinder is provided with a rear seal mount assembly which permits quick connect and disconnect of the beater bar from the mixing cylinder.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

Figure 1:
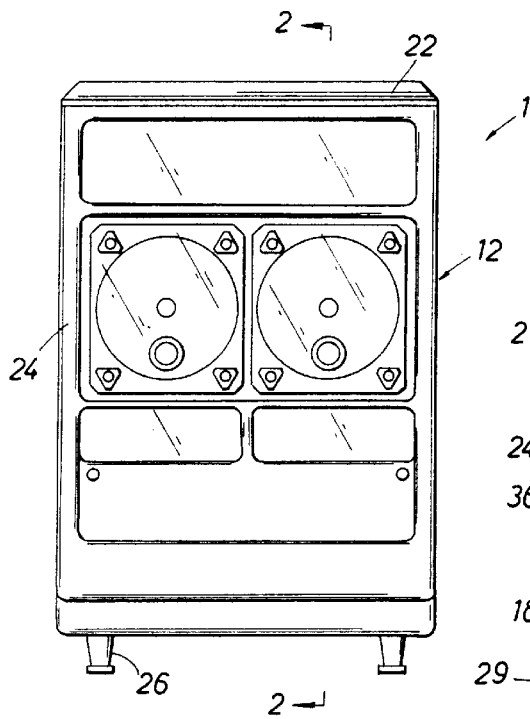
FIG. 1 is a front view of the frozen beverage dispenser housing of the invention.
Figure 2:
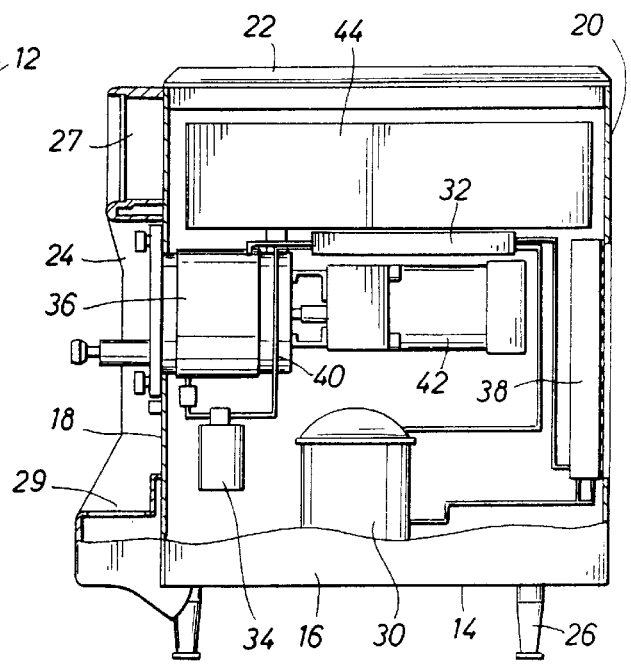
FIG. 2 is a partial, sectional view of the frozen beverage dispenser of the invention taken along line 2—2 of FIG. 1.

Referring first to FIGS. 1 and 2, the frozen beverage dispenser of the invention generally identified by the reference numeral 10 includes a housing or cabinet 12 having a bottom 14, side walls 16, a front panel 18, and a rear panel 20. The top of the housing 12 is closed by a removable cover 22. The housing 12 rests on adjustable support feet 26 located adjacent each corner of the housing 12.

The front panel 18 is a molded plastic panel of unitary construction. The contoured sides 24 of the panel 18 project forwardly and define a light box recess 27 across the panel 18 and a beverage overflow tray 29 across the bottom of the panel 18.

The beverage dispenser 10 of the invention is a dual dispenser unit housed within the housing 12 as shown in FIG. 1. A description will be provided hereinafter of a single refrigeration and drive motor control system of the invention. It is understood, however, that two independently operating systems are housed within the housing 12 powered by a single power source.

Referring now specifically to FIG. 2, it is understood that support brackets and insulation material are not shown in FIG. 2 for purposes of clarity in the drawings in showing the primary components of the beverage dispenser 10. Mounted within the housing 12 is a compressor 30, a heat exchanger 32, a filter/dryer 34, an evaporator 36, and a condenser 38 which comprise the refrigeration system of the invention. The evaporator 36 encloses a mixing cylinder 40 which will hereinafter be described in greater detail. A drive motor 42 is mounted to the back of the mixing cylinder 40. The upper portion of the housing 12 supports the beverage retaining tank 44. The tank 44 is welded or otherwise secured to the structural members of the housing 12 and is closed by the cover 22 which may be removed as needed to fill the tank 44 with the beverage ingredients.

Figure 3:
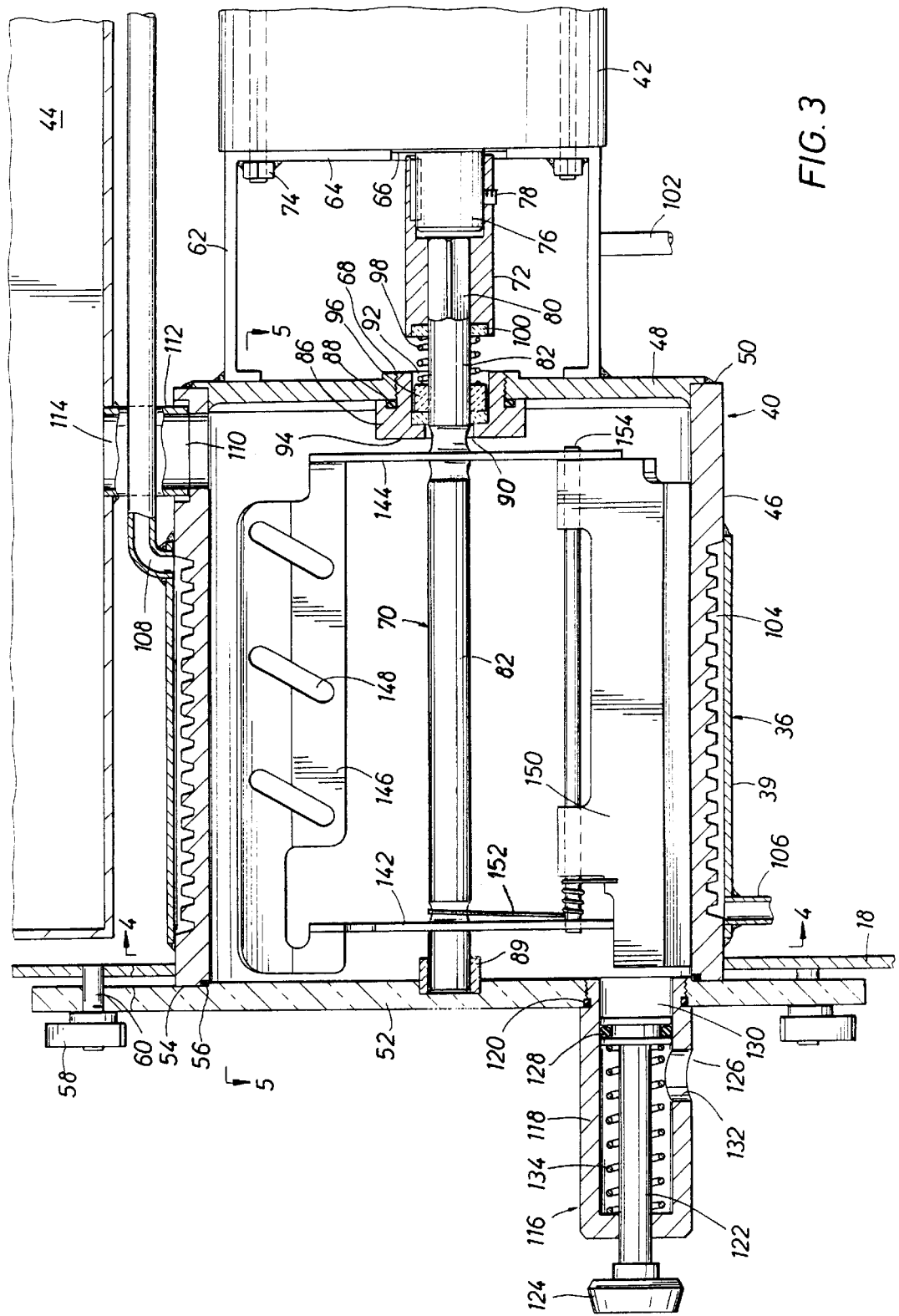
FIG. 3 is a partial sectional view showing the evaporator/mixing cylinder of the invention and the rear seal mount assembly connecting the beater bar to the drive motor of the invention.

Referring now to FIG. 3, the mixing cylinder 40 is shown in greater detail. The mixing cylinder 40 comprises a cylindrical body 46 closed at the rear end thereof by a back plate 48 which is machined and welded on the back circumferential edge 50 of the cylindrical body 46. The surface of the back plate 48 is perpendicular to the cylindrical body 46.

At its forward end, the cylindrical body 46 extends through an opening in the front panel 18. The forward end of the mixing cylinder 40 is covered by a faceplate 52 which is mounted to the panel 18 in abutting contact with the forward circumferential edge 54 of the mixing cylinder 40. The juncture of the faceplate 52 and the mixing cylinder 40 is sealed by a faceplate O-ring seal 56. The face plate 54 is securely mounted to the front panel 18 by a plurality of faceplate knobs 58 which threadably secure the faceplate 52 on upstanding threaded studs 60 projecting from the panel 18 and extending through the faceplate 52. The faceplate 52 may be fabricated of plexiglas, thereby permitting the beverage to be viewed while it is being mixed in the mixing cylinder 40.

A motor mount bracket 62 is welded on the back plate 48 for supporting the drive motor 42 in alignment with the back plate 48. The rear faceplate 64 of the bracket 62 is spaced from and parallel to the rear plate 48 of the mixing cylinder 40. A circular opening 66 extends through the rear faceplate 64 of the bracket 62, which opening 66 is in alignment with the opening 68 extending through the rear plate 48. Alignment of the openings 66 and 68 facilitates the rotational alignment of the beater bar 70 with the motor drive coupling 72.

The motor 42 is mounted to the bracket 62 and secured thereto by a plurality of mounting bolts 74. When the motor 42 is secured in position on the bracket 62, the motor drive shaft 76 extends through the opening 66 and is concentrically positioned therethrough. The motor drive coupling 72 is journaled about the drive shaft 76 and is connected to the drive shaft 76 by a set screw 78. The forward portion of the drive coupling 72 includes an axial passage which is square in cross section and adapted to receive therein the square end 80 of the beater bar drive shaft 82.

The beater bar 70 is concentrically mounted within the mixing cylinder 40. The forward end of the drive shaft 82 is received and supported by a face plate bushing 84 counter sunk and bonded to the inner surface of the faceplate 52. As previously noted, the drive motor engagement end of the drive shaft 82 of the beater bar 70 includes a square profile for rotational engagement with the drive coupling 72 connected to the drive motor 42. The drive shaft 82 extends through the opening 68 in the rear plate 48 and through a rear seal mount assembly which forms a fluid tight seal about the beater bar drive shaft 82.

The rear seal mount assembly comprises a rear seal mount 86 threadably mounted in the opening 68. An O-ring seal 88 provides a seal at the juncture of the seal mount 86 and the rear plate 48. The rear seal mount 86 includes an axial passage 90 extending therethrough for the beater bar shaft 82 to pass through the rear seal mount 86 for engagement with the drive coupling 72. The axial passage 90 opens into a seal recess 92. Within the seal recess 92 is a white ceramic seal 94 in facing contact with a rear seal 96. The ceramic seal 94 and rear seal 96 are maintained in facing contact by a compression spring 98 journaled about the beater bar drive shaft 82. The compression spring 98 extends between the seal 96 and a second seal 100 located in a counter sunk recess formed on the end of the drive coupling 72. When the rear seal mount 94 is fully threaded in the opening 68, the spring 98 is maintained under compression forcing the ceramic seal 94 and rear seal 96 in sealing contact with the rear seal mount 86 about the beater bar drive shaft 82. The rear seal mount system is self contained and does not require lubrication to maintain sealing contact with the beater bar shaft 82 and the mixing cylinder 40. In the event the rear seal mount assembly becomes worn and leaks, a drainage tube 102 is provided for directing any fluid accumulated in the bracket 62 to a drainage pan.

Referring still to FIG. 3, it will be observed that the evaporator 30 is integrally formed with the cylindrical wall 46 of the mixing cylinder 40. A series of grooves 104 are formed in the circumferential exterior surface of the wall 46. The grooves 104 are enclosed by the evaporator shell 39. The shell 39 is slid over and welded to the cylindrical body 46 of the mixing cylinder 40. The grooves 104 increase the contact surface area of the cylinder 40 and the refrigerant and aid, much like a baffle, the rapid distribution of the refrigerant about substantially the entire length of the mixing cylinder 40 thereby achieving rapid freeze down time for the beverage mix. The refrigerant is directed into the evaporator 36 through an inlet port 106 and exits the evaporator 36 through an outlet port 108.

The beverage mix is admitted into the mixing cylinder 40 through an inlet port 110 which is in fluid communication via a connecting conduit 112 with the beverage retaining tank 44 which is provided with an outlet port 114. The feed tank 44 is mounted above the mixing cylinder 40 so that the beverage ingredients flow freely into the mixing chamber 40 as a portion of the beverage is dispensed via the faucet 116.

The faucet 116 is a spring actuated plunger mechanism comprising a cylindrical body 118 which is threadably mounted to the faceplate 52. An O-ring seal 120 provides a sealing contact at the threaded juncture of the faucet body 118 to the faceplate 52. The faucet 116 includes a faucet plunger 122. The plunger 122 extends out of the faucet body 118 and terminates at a faucet cap 124. The opposite end of the plunger 122 terminates at a piston 126. A plunger O-ring 128 provides a seal about the periphery of the piston 126 thereby sealing off the beverage outlet port 130 formed in the mixing cylinder 40. A downwardly facing dispensing port 132 provides an outlet for the frozen beverage upon retraction of the plunger 122 so that the piston 126 clears the port 132. Upon release of the plunger 122, a spring 134 moves the piston 126 to its original closing position.

Figure 6:
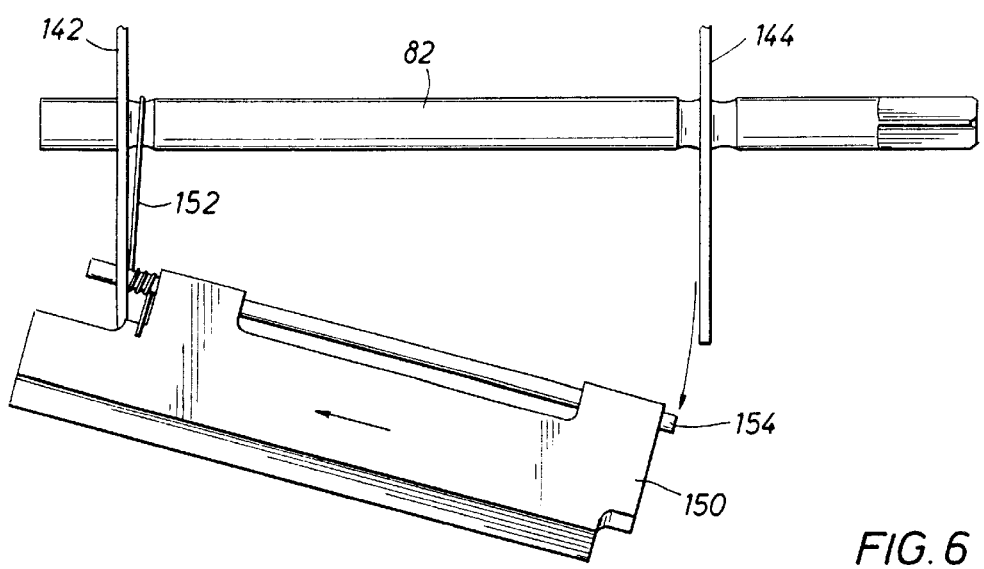
FIG. 6 is a partial side view depicting the disassembly of the beater bar of the invention.
Figure 4:
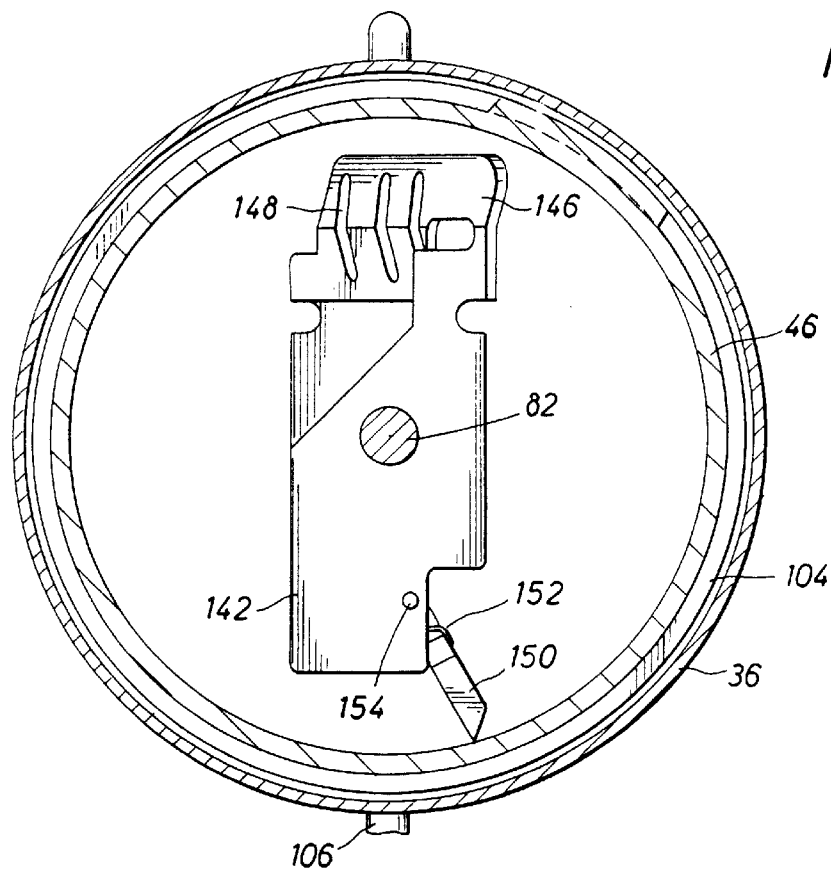
FIG. 4 is a sectional view of the evaporator/mixing cylinder of the invention taken along line 4—4 of FIG. 3.
Figure 5:
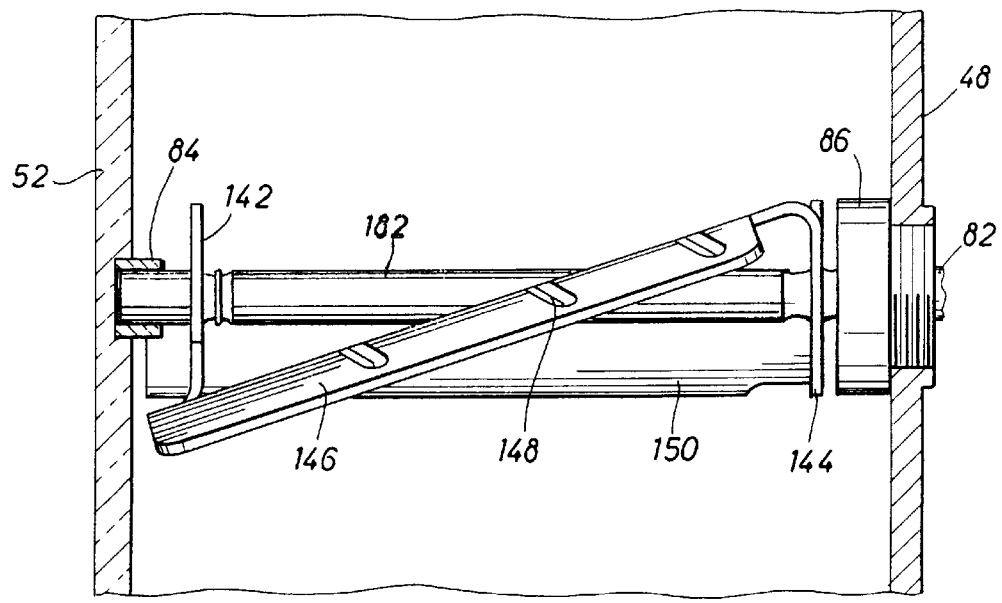
FIG. 5 is a partial, sectional view depicting the beater bar of the invention mounted within the mixing cylinder.

Referring now to FIGS. 4–6, it will be observed that the beater bar 70 is concentrically mounted within the cylindrical body 46 of the mixing cylinder 40. The rotational axis of the beater bar 70 is coincident with the central longitudinal axis of the mixing cylinder 40. The rotational shaft 140 of the beater bar 70 is in rotational alignment with the drive coupling 72 and drive shaft 76 of the drive motor 42. The beater bar 70 includes a pair of spaced flanges 142 and 144 which are perpendicular to the drive shaft 82. An angularly extending mixing blade 146 is spaced from and parallel to the shaft 82 and spans the space between the flanges 142 and 144. A plurality of elongate aperture 148 extend through the blade 146, which aperture 148 aid in the breakdown of ice crystals which form as the beverage freezes.

A scrapper blade 150 extends between the flanges 142 and 144 opposite the angular blade 146 and likewise is spaced from and parallel to the shaft 82. The scraper blade 150 is biased outward toward the inner surface of the mixing cylinder 40 by a spring 152 for scraping any product which may accumulate on the inner surface of the cylindrical body 46 of the mixing cylinder 40. As best shown in FIG. 6, the scraper blade 150 may be removed and replaced in the event of wear. Disassembly of the scraper blade 150 is easily accomplished by laterally compressing the spring 152 against the flange 142 and thereby disengaging the pivot end 154 from the flange 144.

Figure 7:
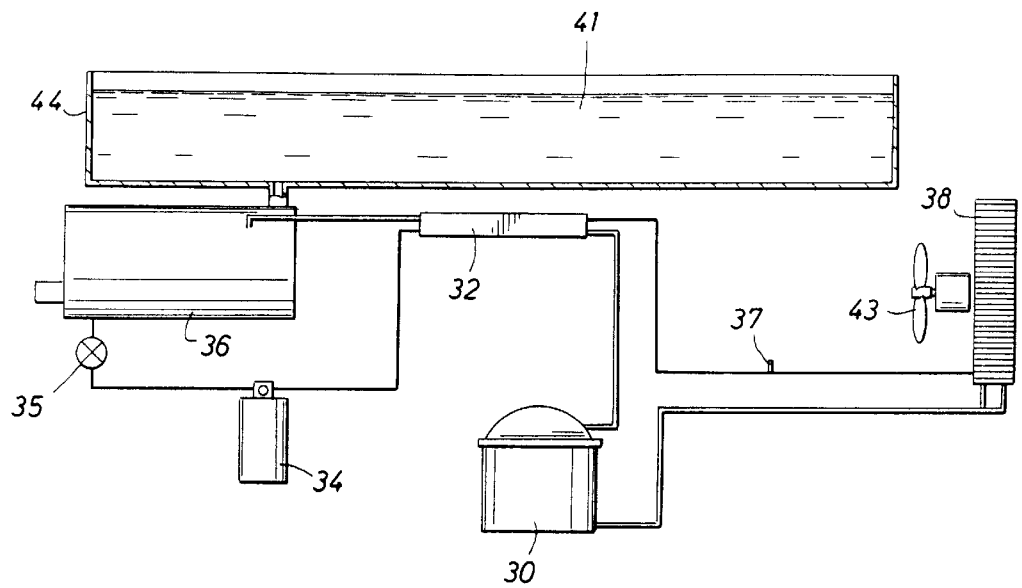
FIG. 7 is a schematic view of the air cooled refrigeration system of the invention.
Figure 8:
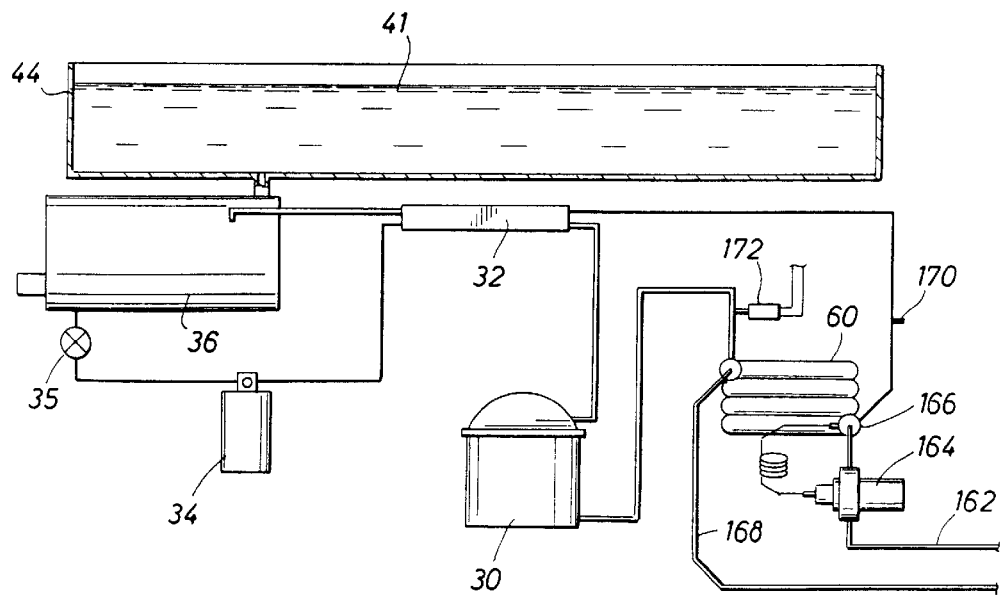
FIG. 8 is a schematic view of the water cooled refrigeration system of the invention.

Referring now to the refrigeration system of the invention, it is a closed loop system schematically shown in FIG. 7 and FIG. 8. A compressor 30 is provided for circulating a refrigerant throughout the system. The refrigerant passes through the heat exchanger 32 and a filter/dryer 34. The refrigerant then passes through an expansion valve 35 into the evaporator 36 where it maintains the temperature in the mixing chamber 40 within the range for optimum formation of a frozen slush beverage. The refrigerant then exists the evaporator 36 and again passes through the heat exchanger 32 as it is directed to the air cooled condenser 38 which is provided with a fan 43 for drawing air past the condenser 38. A high side access valve 37 is incorporated in the line between the heater exchanger 32 and air cooled condenser 38. A liquid beverage mixture 41 is retained in the tank 44 and supplied to the mixing chamber 40 under gravity flow.

The schematic diagram of the refrigeration system of the invention shown in FIG. 8 is substantial identical to the system shown in FIG. 7, however, the refrigeration system of FIG. 8 is a water cooled system incorporating a water cooled condenser 160 in line between the heat exchanger 32 and the compressor 30. The water cooled system includes a water inlet line 162 connected to a water valve 164 which in turn is connected to the inlet 166 of the water cooled condenser 160. Water is circulated out the condenser 160 through the water outlet line 168. The water cooled system includes a high side access valve 170 and a high pressure switch 172.

Figure 10:
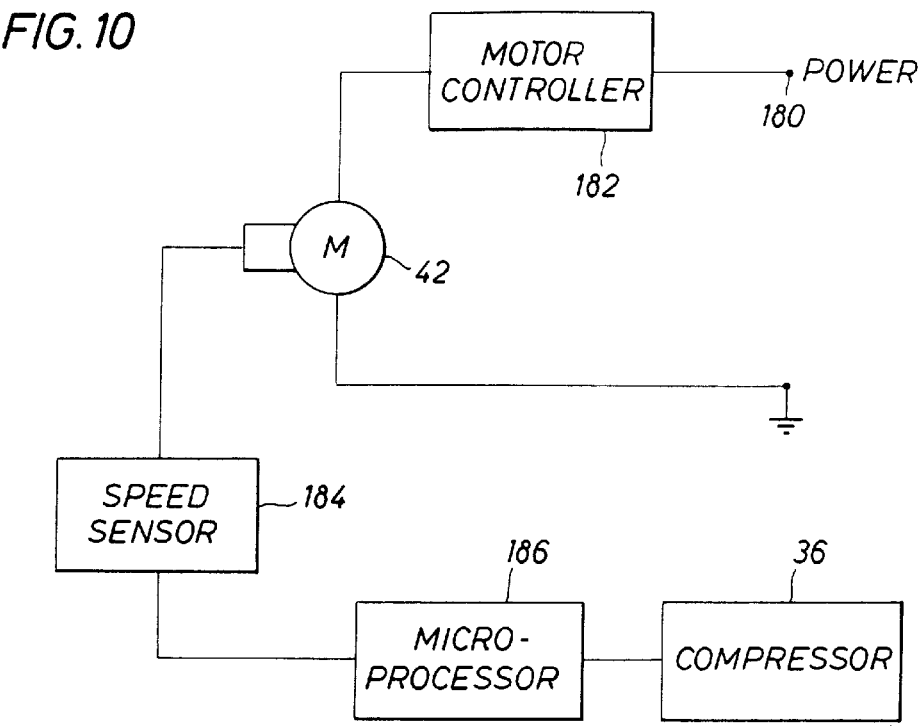
FIG. 10 is a simplified block diagram depicting the speed/torque monitoring system of the invention.
Figure 9:
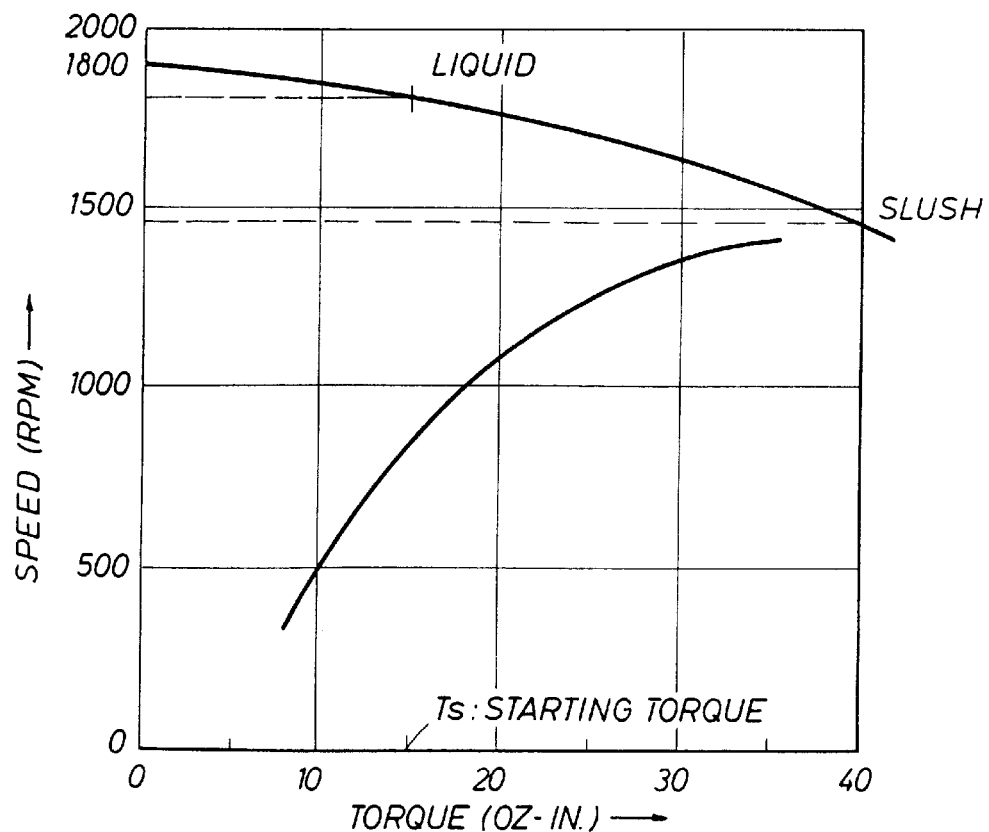
FIG. 9 is a speed/torque diagram depicting the speed/torque characteristics monitored by the direct drive control system of the invention.

Attention is now directed to FIGS. 9 and 10. Consistently and accurately maintaining a slush thickness regardless of the beverage ingredients placed in the feed tank 44 is difficult to accomplish. The dispenser 10 of the present disclosure controls the freezing operation by utilizing a solid state direct drive control system which accurately monitors and controls the slush thickness of the product dispensed from the dispenser 10 by monitoring the motor speed to the beater bar torque relationship. The control system of the invention regulates the thickness of frozen slush in the mixing cylinder 40 by cycling on and off the flow of refrigerant to the evaporator 36.

The beater bar 70 located in the mixing cylinder 40 is coupled to the direct drive motor 42 which continuously rotates when the dispenser 10 is in operation. The control system of the invention shown in the schematic drawing of FIG. 10 monitors the motor speed versus the rotational resistance on the beater bar 70 which translates torque to the drive motor 42. As the refrigerant flows through the evaporator 36 and drops the temperature of the beverage in the mixing cylinder 40, it causes the beverage to freeze and form a slush. As the slush thickens, the resistance on the beater bar 70 rotating through the slush increases thereby slightly slowing down the speed of the motor 42. The speed versus torque relationship is shown in the diagram of FIG. 9.

When the beverage has frozen to the desired slush thickness, an electronic solid state board such as the microprocessor 186, which continuously monitors the speed of the motor, signals and turns off the compressor 30 thereby terminating the flow of refrigerant to the evaporator 36. As the temperature in the mixing cylinder 40 increases, the slush begins to liquefy and provides less resistance to the rotation of the beater bar 70 resulting in an slight increase in motor speed. When the motor speeds up, the drive control system of the invention automatically turns on the compressor and flows refrigerant to the evaporator 36. Likewise, when beverage is removed from the dispenser, the motor speeds up and the drive control system automatically turns on the flow of refrigerant thereby freezing the beverage in the mixing cylinder 40 to the desired thickness instantly regardless of the freezing characteristics of the beverage ingredients or fruit and pulp particulates. The drive control system may be adjusted to control the slush thickness of the beverage to accommodate for personal preference.

Referring now specifically to FIG. 10, a power source 180 provides power to the dispenser 10 of the invention. A motor controller 182 is connected between the power source 180 and the motor 42. A speed sensor 184 connects the motor 42 to a micro-processor 186. The micro-processor 186 which monitors the speed of the motor 42 and turns the compressor 36 on and off, thereby controlling the flow of refrigerant to the evaporates 36. The motor speed is continuously monitored for consistently and accurately maintaining the shush thickness.

While the foregoing is directed to the preferred and illustrated embodiments of the invention, other and further embodiments of the invention may be devised without departing from the basic scope thereof, which scope thereof is determined by the claims which follow.

What is claimed is:

1. A beverage dispenser refrigeration system including a compressor, evaporator and motor, the improvement comprising a speed sensor monitoring the rotational speed of the motor and a microprocessor communicating with said speed sensor and compressor for cycling the compressor on and off in response to fluctuation of motor speed between predetermined limits.

2. A beverage dispenser refrigeration system including a mixing cylinder and a beater bar mounted within the mixing cylinder, the beater bar including a drive shaft having a distal end extending through a back plate of the mixing cylinder, the improvement comprising a rear seal mount assembly forming a seal about the distal end of the beater bar drive shaft, said seal mount assembly including an axial passage extending therethrough opening into a seal recess, and further including ceramic seal means and rear seal means journaled about the beater bar drive shaft and maintained in facing contact within said seal recess by spring means journaled about the beater bar drive shaft.

* * * * *